(12) United States Patent
Spitz et al.

(10) Patent No.: US 10,885,570 B2
(45) Date of Patent: Jan. 5, 2021

(54) SYSTEM AND METHOD FOR MANAGING A PRODUCT EXCHANGE

(71) Applicant: AiBUY, Inc., Dallas, TX (US)

(72) Inventors: Robert K. Spitz, Amhert, NH (US); Todd Downing, Irving, TX (US); Christian Briggs, Austin, TX (US)

(73) Assignee: AiBUY, Inc., Dallas, TX (US)

( * ) Notice: Subject to any disclaimer, the term of this patent is extended or adjusted under 35 U.S.C. 154(b) by 0 days.

(21) Appl. No.: 15/639,786

(22) Filed: Jun. 30, 2017

(65) Prior Publication Data

US 2017/0301003 A1    Oct. 19, 2017

Related U.S. Application Data

(63) Continuation-in-part of application No. PCT/US2015/068311, filed on Dec. 31, 2015.
(Continued)

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06Q 10/087* (2013.01); *G06Q 20/102* (2013.01); *G06Q 20/12* (2013.01)

(58) Field of Classification Search
CPC .................................................. G06Q 30/0631
See application file for complete search history.

(56) References Cited

U.S. PATENT DOCUMENTS 5,206,934 A    4/1993    Naef, III
6,446,261 B1    9/2002    Rosser
(Continued)

FOREIGN PATENT DOCUMENTS

CN         102483826 A    5/2012
WO    WO 2011/149491    12/2011
(Continued)

OTHER PUBLICATIONS

Mistry, Oly, and Sandip Sen. "Tag recommendation for social bookmarking: Probabilistic approaches." Multiagent and Grid Systems 8.2 (2012): 143-163.*
(Continued)

*Primary Examiner* — Kathleen Palavecino

(57) ABSTRACT

An embodiment of this disclosure provides an apparatus. The apparatus includes a memory element configured to store a plurality of products and services and a processor. The processor is configured to receive profile information for a user accessing a plurality of video content. The processor is also configured to receive video content information for each of the plurality of video content being accessed by the user in a smart viewer. The video content information identifies at least one category associated with each of the plurality of video content. The processor is also configured to identify one or more of the plurality of products or services based on the profile information and the at least one category of the video content information. The processor is also configured to send the one or more of the plurality of products or services to the smart viewer.

23 Claims, 8 Drawing Sheets

Related U.S. Application Data

(60) Provisional application No. 62/120,210, filed on Feb. 24, 2015, provisional application No. 62/099,003, filed on Dec. 31, 2014, provisional application No. 62/526,867, filed on Jun. 29, 2017.

(51) Int. Cl.
  *G06Q 10/08* (2012.01)
  *G06Q 20/10* (2012.01)
  *G06Q 20/12* (2012.01)

(56) References Cited

U.S. PATENT DOCUMENTS

| | | |
|---|---|---|
| 6,608,636 B1 | 8/2003 | Roseman |
| 6,789,120 B1 | 9/2004 | Lee et al. |
| 7,730,132 B2 | 6/2010 | Ludwig et al. |
| 8,150,464 B2 | 4/2012 | Day |
| 8,387,087 B2 | 2/2013 | Girouard et al. |
| 8,423,467 B1 | 4/2013 | Johansson et al. |
| 8,910,201 B1 | 12/2014 | Zamiska et al. |
| 9,047,632 B2 | 6/2015 | McCarthy, III |
| 9,703,463 B2 * | 7/2017 | Avedissian ......... G06Q 30/0261 |
| RE46,865 E | 5/2018 | Schifone |
| 2002/0056109 A1 | 5/2002 | Tomsen |
| 2003/0040962 A1 | 2/2003 | Lewis |
| 2003/0055723 A1 | 3/2003 | English |
| 2004/0139156 A1 | 7/2004 | Matthews et al. |
| 2004/0153385 A1 | 8/2004 | Allibhoy et al. |
| 2004/0244029 A1 | 12/2004 | Gross |
| 2005/0229227 A1 * | 10/2005 | Rogers ................ G06Q 30/02 725/115 |
| 2005/0235033 A1 | 10/2005 | Doherty |
| 2006/0132607 A1 | 6/2006 | Kimber et al. |
| 2006/0256133 A1 | 11/2006 | Rosenberg |
| 2007/0150370 A1 | 6/2007 | Staib et al. |
| 2007/0260520 A1 | 11/2007 | Jha et al. |
| 2008/0097843 A1 | 4/2008 | Menon et al. |
| 2008/0162343 A1 | 7/2008 | Bedier |
| 2010/0017299 A1 | 1/2010 | Pirani |
| 2010/0077428 A1 | 3/2010 | Arnold et al. |
| 2010/0082441 A1 | 4/2010 | Doemling et al. |
| 2010/0153831 A1 | 6/2010 | Beaton |
| 2010/0332329 A1 | 12/2010 | Roberts et al. |
| 2011/0071865 A1 | 3/2011 | Leeds et al. |
| 2012/0079021 A1 | 3/2012 | Roman et al. |
| 2013/0014155 A1 | 1/2013 | Clarke et al. |
| 2013/0031582 A1 | 1/2013 | Tinsman et al. |
| 2013/0054757 A1 | 2/2013 | Spitz et al. |
| 2013/0151340 A1 | 6/2013 | Barbieri et al. |
| 2013/0211891 A1 | 8/2013 | Daniel et al. |
| 2013/0254018 A1 | 9/2013 | Rao |
| 2014/0007155 A1 | 1/2014 | Vemparala et al. |
| 2014/0019860 A1 | 1/2014 | Sathish et al. |
| 2015/0189355 A1 | 7/2015 | Korbecki |
| 2015/0245084 A1 | 8/2015 | Downing et al. |
| 2015/0264417 A1 | 9/2015 | Spitz et al. |
| 2016/0012398 A1 * | 1/2016 | Dantu ................ G06Q 20/0855 705/44 |

FOREIGN PATENT DOCUMENTS

| | | |
|---|---|---|
| WO | WO 2015/131126 | 9/2015 |
| WO | WO 2015/138612 | 9/2015 |
| WO | WO 2016/109810 | 7/2016 |

OTHER PUBLICATIONS

Extended European Search Report for European Application No. 15760646.8, dated Oct. 24, 2017, 11 pages.
Office Action for U.S. Appl. No. 14/644,603, dated Nov. 2, 2017, 11 pages.
Office Action for U.S. Appl. No. 14/966,780, dated Mar. 9, 2017, 29 pages.
Office Action for U.S. Appl. No. 14/633,986, dated Sep. 3, 2015, 16 pages.
Office Action for U.S. Appl. No. 14/633,986, dated Nov. 23, 2016, 21 pages.
Office Action for U.S. Appl. No. 14/633,986, dated May 3, 2016, 18 pages.
Office Action for U.S. Appl. No. 14/633,986, dated Jun. 5, 2017, 25 pages.
International Search Report and Written Opinion for International Application No. PCT/US2015/018140, dated Jun. 3, 2015, 9 pages.
Supplementary Partial European Search Report for European Application No. 15760646.8, dated Jul. 21, 2017, 7 pages.
Office Action for U.S. Appl. No. 14/644,603, dated Dec. 4, 2015, 7 pages.
Office Action for U.S. Appl. No. 14/644,603, dated Apr. 15, 2016, 8 pages.
Office Action for U.S. Appl. No. 14/644,603, dated Jan. 31, 2017, 16 pages.
International Search Report and Written Opinion for International Application No. PCT/US2015/019979, dated Jul. 30, 2015, 10 pages.
Kappe, F. M., "Aspects of a Modem Multi-Media Information System," Dissertation for the Award of the Academic Degree Doctor of Technical Sciences at the Graz University of Technology, Institute for Foundations of Information Processing and Computer Supported Media (Iicm), Graz University of Technology, Jun. 1991.
Jeffay, K. et al., "System Design for Workstation-Based Conferencing with Digital Audio and Video," Proceedings of TRI COMM '91, IEEE Conference on Communications Software: Communications for Distributed Application and Systems, Chapel Hill, North Carolina, Apr. 18-19, 1991, pp. 169-177.
Reid, F. et al., "An Analysis of Anonymity in the Bitcoin System," Cha. 1 (online), <URL: https://arxiv.org/pdf/1107.4524.pdf>, May 7, 2012, 29 pages.
International Search Report for International Application No. PCT/US2015/068311 dated Apr. 14, 2016.
Written Opinion of the International Searching Authority for International Application No. PCT/US2015/068311 dated Apr. 14, 2016.
Office Action for U.S. Appl. No. 14/633,986, dated Dec. 28, 2017, 27 pages.
Office Action for U.S. Appl. No. 14/633,986, dated Oct. 26, 2018, 27 pages.
First Office Action for Chinese Application No. 201580013586.8, dated Feb. 2, 2019, 28 pages.
Office Action for U.S. Appl. No. 14/644,603, dated Jan. 2, 2019, 13 pages.
Zhang, S., "Ganhui Firm E-Commerce Sites Construction," IT Book of CMFD, No. 3, 2012, pp. 1139-1539.

* cited by examiner

SYSTEM AND METHOD FOR MANAGING A PRODUCT EXCHANGE

This application is a continuation-in-part of International PCT Patent Application No. PCT/US2015/68311, filed Dec. 31, 2015, which in turn claims priority to and benefit of U.S. Provisional Application No. 62/099,003, filed on Dec. 31, 2014, and U.S. Provisional Application No. 62/120,210, filed on Feb. 24, 2015; this application also claims priority to and benefit of U.S. Provisional Application No. 62/526,867, filed on Jun. 29, 2017; the entirety of each of the above-identified applications are expressly incorporated by reference herein for all purposes.

TECHNICAL FIELD

The present disclosure is directed, in general, to software, and more specifically, to a system and method for managing a global product exchange and transactions taking place in the global product exchange.

BACKGROUND

The primary current economic model for online video is pure subscription services, traditional video advertisements embedded into the video stream, or a combination of both. The problem with embedded advertising is that it both disrupts the viewer's attention and also requires a transition away from viewing the video content to investigate more, or to purchase the advertised product or service.

SUMMARY

According to an embodiment of the present disclosure, a system and method is disclosed for managing a global product exchange and transactions taking place in the global product exchange.

An embodiment of this disclosure provides an apparatus. The apparatus includes a memory element configured to store a plurality of products and services and a processor. The processor is configured to receive profile information for a user accessing a plurality of video content. The processor is also configured to receive video content information for each of the plurality of video content being accessed by the user in a smart viewer. The video content information identifies at least one category associated with each of the plurality of video content. The processor is also configured to identify one or more of the plurality of products or services based on the profile information and the at least one category of the video content information. The processor is also configured to send the one or more of the plurality of products or services to the smart viewer.

Another embodiment of this disclosure provides a method for product matching. The method includes receiving profile information for a user accessing a plurality of video content. The method also includes receiving video content information for each of the plurality of video content being accessed by the user in a smart viewer. The video content information identifies at least one category associated with each of the plurality of video content. The method also includes identifying one or more of a plurality of products or services based on the profile information and the at least one category of the video content information. The method also includes sending the one or more of the plurality of products or services to the smart viewer.

Yet another embodiment of this disclosure provides a non-transitory computer readable medium embodying a computer program. The computer program comprising computer readable program code that when executed causes at least one processing device to receive profile information for a user accessing a plurality of video content. The computer program also comprising computer readable program code that when executed causes at least one processing device to receive video content information for each of the plurality of video content being accessed by the user in a smart viewer. The video content information identifies at least one category associated with each of the plurality of video content. The computer program also comprising computer readable program code that when executed causes at least one processing device to identify one or more of the plurality of products or services based on the profile information and the at least one category of the video content information. The computer program also comprising computer readable program code that when executed causes at least one processing device to send the one or more of the plurality of products or services to the smart viewer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The FIGURES, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1:
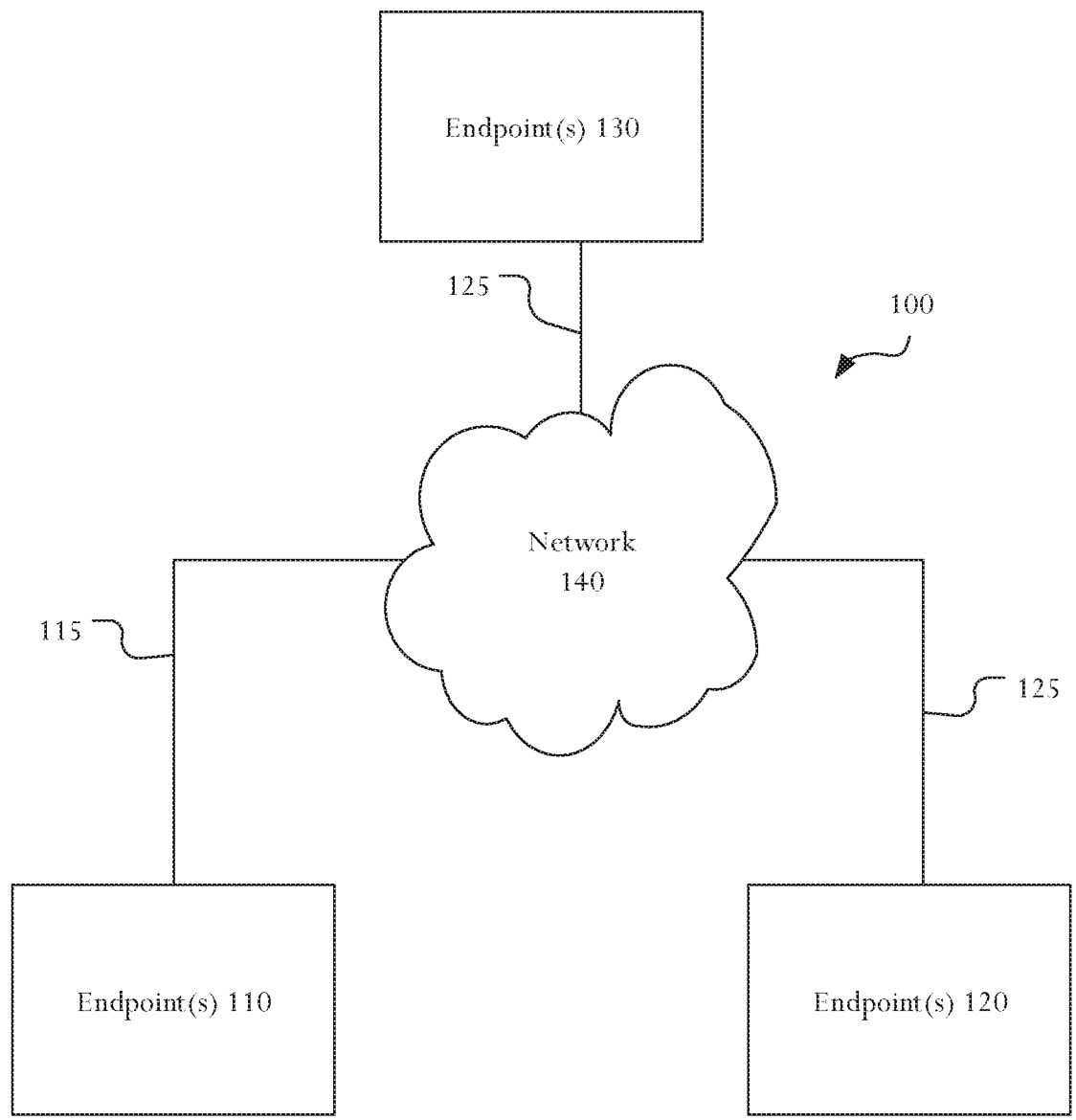
FIG. 1 is a simplified block diagram illustrative of a communication system that can be utilized to facilitate communication between endpoint(s) and endpoint(s) (including but not limited to endpoint compute devices, such as mobile phones, tablets, computers, smart devices, etc.) through a communication network, according to particular embodiments of the disclosure.

FIG. 1 is a simplified block diagram illustrative of a communication system 100 that can be utilized to facilitate communication between endpoint(s) 110, endpoint(s) 120, and 130 through a communication network 140, according to particular embodiments of the disclosure. As used herein, "endpoint" may generally refer to any object, device, software, or any combination of the preceding that is generally operable to communicate with another endpoint. The endpoint(s) may represent a user device or account, which in turn may refer to a user profile representing a person. The user profile may comprise, for example, an address for the user, a user name, a passcode, other user information, or any combination of the preceding. Additionally, the endpoint(s) may represent a device that comprises any hardware, software, firmware, or combination thereof operable to communicate through the communication network 140.

Examples of an endpoint(s) include, but are not necessarily limited to, a computer or computers (including servers, applications servers, enterprise servers, desktop computers, laptops, netbooks, tablet computers (e.g., IPAD), a switch, mobile phones (e.g., including IPHONE and ANDROID-based phones), networked glasses (e.g., GOOGLE GLASS)), networked televisions, networked disc players, components in a cloud-computing network, or any other device or component of such device suitable for communicating information to and from the communication network 140. Endpoints may support Internet Protocol (IP) or other suitable communication protocols. Endpoints may additionally include a medium access control (MAC) layer and a physical (PHY) layer interface that conforms to IEEE 701.11. If the endpoint is a device, the device may have a device identifier such as the MAC address and may have a device profile that describes the device.

The communication network 140 and links 115, 125, and 135 to the communication network 140 may include, but are not limited to, a public or private data network; a telephony network, a local area network (LAN); a metropolitan area network (MAN); a wide area network (WAN); a wireline or wireless network (GSM, CDMA, LTE, WIMAX, or the like); a local, regional, or global communication network; portions of a cloud-computing network; a communication bus for components in a system; an optical network; a satellite network; an enterprise intranet; other suitable communication links; or any combination of the preceding. In particular embodiments, portions of the links 115, 125, 135 or communication network 140 may be on the Internet.

Although endpoint generally appears as being in a single location, the endpoint(s) may be geographically dispersed, for example, in cloud computing scenarios. As used in this document, "each" may refer to each member of a set or each member of a subset of a set.

When the endpoints(s) 110, 120, 130 communicate with one another, any of a variety of security schemes may be utilized. As an example, in particular embodiments, endpoint(s) 120 may represent a client and endpoint(s) 130 may represent a server in client-server architecture. The server and/or servers may host a website. And, the website may have a registration process whereby the user establishes a username and password to authenticate or log in to the website. The website may additionally utilize a web application for any particular application or feature that may need to be served up to the website for use by the user.

Additionally, in particular configurations, the communication between endpoints 110 and 120 may be facilitated through a communication path through endpoint 130.

Various embodiments described herein may avail benefits from and/or utilize Cinsay, Inc.'s ("Cinsay") Smart Container™ Technology, which is briefly described below and is also described in U.S. application Ser. No. 13/598,443 filed Aug. 29, 2012 (the entirety of which is hereby expressly incorporated by reference herein for all purposes) and claiming priority to several provisional applications. Cinsay, the Applicant, provides an innovative method for merchants to reach their customers online. In the traditional online sales model, merchants need to create search or display ads which show up when online consumers visit search engine sites or various web properties. If the consumer sees an interesting ad related to a product or service, they need to leave their current activity and visit some other web destination to discover more information or make an online purchase. If the consumer is actively shopping online, then the traditional multistep model of stopping what they are doing to navigate to a new web site may or may not be workable. However, if the consumer is on a social site interacting with friends, reading the news, playing games, or engaged in other online activities, such a consumer is much less likely to leave their current activity to visit some external internet destination.

The Cinsay Smart Container™ code model solves this problem by bringing the product information or store to the consumer. This model utilizes an innovative technology that virally syndicates across the web, for, example using components described with reference to FIGS. 1 and 7 or using other components. Such a technology is ideal for those types of destinations that online consumers tend to frequent such as social networks and blogs. Regardless, if the Smart Container™ code is located on a web page, a blog article, a social network page or wall, or a mobile device, a user can complete their transaction right there with no need to be diverted to some external destination.

Smart Container™ code utilizes intelligent internet objects that virally syndicate and propagate across the web and other connected network and mobile devices. This code can be configured in a variety of ways to address the entire value chain of online marketing and shopping. Non-limiting examples include impressions, clicks, lead generation, and performing e-commerce transactions. A modern shopping experience works best when interactive media is used. One of the most appealing forms of media for sales and shopping is video. Video allows a much more lifelike representation than text or static pictures. Video also creates a much richer product browsing or shopping experience.

Cinsay's Smart Container™ code is normally configured with a video player window, a selection of products or services being offered, and a variety of related video clips. This collection of video clips allows the consumer to learn more about the products or services being offered. The consumer can select any of these offered items to get more details, all enclosed within the Smart Container™ code technology.

These offered items (products or services) may be items being advertised or sold. Depending on the type, the Smart Container™ code may allow the consumer to request to be contacted, or even purchase the object, right there. The consumer need not leave their current activity or web page. The offered items could also include getting discounts or coupons. The consumer may even be an opportunity to donate to a charity or political campaign. Of course, sometimes it does make sense to visit another internet destination, and if appropriate, the consumer can certainly be linked to such a destination as well.

Because the Smart Container™ code handles all the complexity, such code can turn the simplest web site into an instant e-commerce store. This enables anyone to transact online without having to deal with the complexity of setting up an e-commerce site. For merchants with an e-commerce site, the technology readily enables a much richer shopping experience. For the creative hobbyist or local band, the technology lets them readily sell directly to interested consumers.

The Cinsay Smart Container™ code is also auto customizing, according to particular configurations. If the device is a traditional PC or laptop, the code will render using the optimal technology, which may be flash. On mobile devices, such as IPhones, IPads, or Android phones, HTML5 or a native interactive app will likely get used. The items in the Smart Container™ code also know about each other, according to particular configurations. When a video is playing, the container can update the product and service objects being shown that correspond with the particular sequence in a video segment. The code allows a mini QVC shopping channel to be created and syndicated across the internet. Beyond device type, there are other dimensions of customization. Smaller devices and some environments such as social site restrict window sizes, so the Smart Container™ code adapts. In addition, it may be appropriate to provide different content based on geo-location, so the Smart Container™ code can customize for these as well.

Cinsay Smart Container™ code virally syndicate across the internet following the more popular network paths. The code can be hosted on traditional web pages, blogs, contained in emails, operate on mobile devices, or propagate social networks. Because the Smart Container™ code is flexible, they can also be setup in the form factor of a display ad unit and distributed via ad servers on display advertising networks. When the code exists on social networks like Facebook, they can ride the wave of user "likes." For example, if a woman shopper likes some great shoes shown in a Smart Container™ object interface, the Smart Container™ object can propagate directly to their "wall." Now all their friends see the Cinsay smart object, and can view or transact right there on their own wall. Of course, if any of their friends also "like" it, the Cinsay Smart Container™ object propagates and rides the wave further out into that branch of the social network yielding a potential exponential growth factor. Maybe the container does not involve products like shoes, but instead supports a politician running for office. Their supporters may be passionate about the message and "like" it, again making it available to their network Now, similarly minded political supporters can view those messages too, and if so moved donate to the cause.

Another example is sports. In this case, a sports fan may wish to watch that content on their HD large screen TV. More and more have interconnected devices such as a Roku device and a Chromecast device, and Cinsay Smart Container™ code may be sent to such an IP TV box as well.

When merchants launch and syndicate their Smart Container™ objects onto the internet, they what to know how their campaign is performing. Cinsay Smart Container™ object reports back status on events and transactions of interest such as impressions, video views, clicks, leads, and sales. All such events/transactions can be sent back as events occur, providing details on how they are doing. Because the containers are smart, they can be instructed to change behavior, offer different clips, update products, or to end when it is time to stop the marketing or sales campaign.

Another form of tracking relates to how the Cinsay Smart Container™ code is propagated. A merchant may wish to use affiliates to help syndicate them, and pay them a percentage based on the transactions resulting from their work. Cinsay Smart Container™ objects can be tagged with affiliate tracking identifiers allowing status reports and transactions from that container instance or its descendants to be properly filtered. Another tracking usage may be for a politician to assign affiliate codes to their supporters and be able to measure whose efforts result in the most new supporters.

Cinsay Smart Container™ objects are designed to be highly scalable according to particular configurations. Rather than burden a single website with massive traffic which would result from a traditional model of bringing all consumers to the store, Cinsay Smart Container™ code operates in a distributed manner. Cinsay Smart Container™ code execute where they are, on blog, social network or mobile device. They fetch their instructions when started, and then gather their product items and video streams from a worldwide distributed content delivery network. This results in highly scalable architecture allowing millions of concurrent consumers.

By bringing the store to the customer, Cinsay Smart Container™ code enables many new ways for merchants to connect with their consumers without disrupting the consumer's web activities. The end result is to connect the consumer directly with the merchant eliminating the middleman and promoting a much more natural shopping experience.

Figure 7:
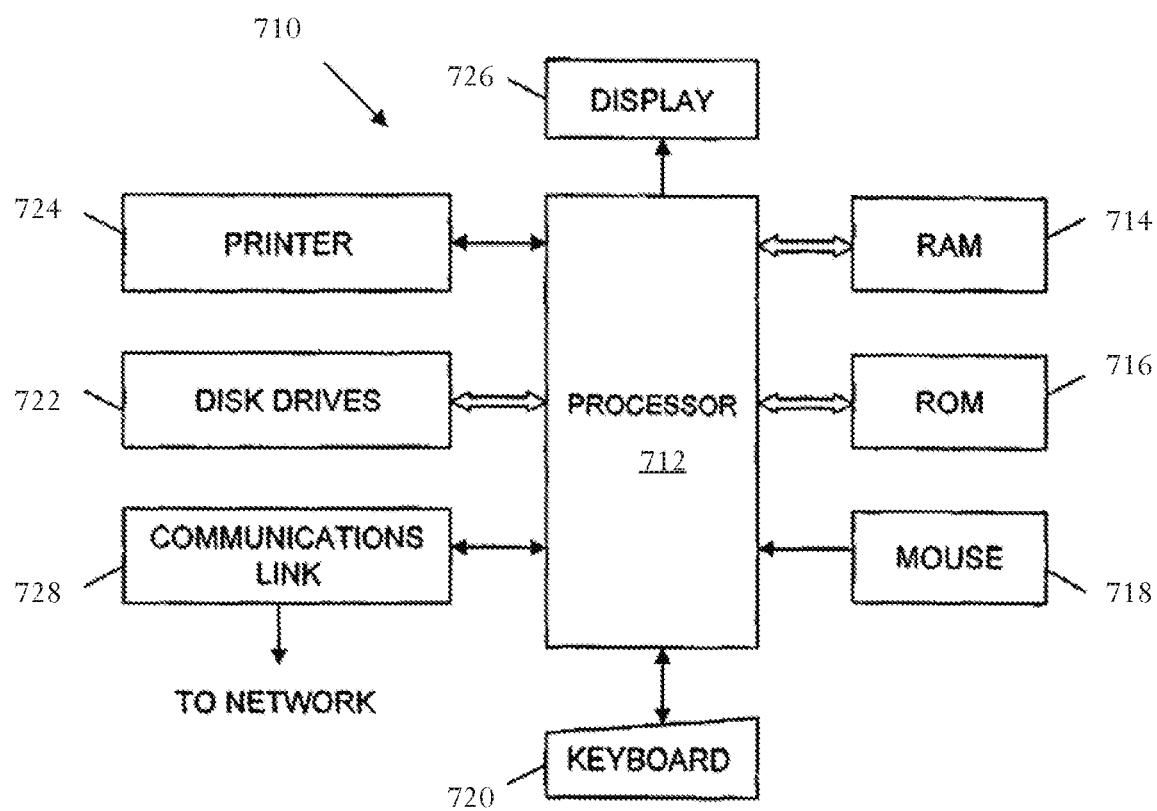
FIG. 7 is an embodiment of a general purpose computer that may be used in connection with other embodiments of the disclosure to carry out any of the above-referenced functions and/or serve as a computing device for the endpoint(s) of FIG. 1.

The functionality of the above description, once again, may avail from any of the components described in FIGS. 1 and 7 or other suitable components. The code, itself, may be written in any suitable format, including but not limited to Java, C++, C-sharp, HTML, HTML5, and the like.

There exists a variety of content in the world that is independent—existing separate from any special containers such as a Cinsay Smart Container™ code. Certain embodiments of the disclosure seek to harness the power of such content by dynamically binding supplemental transactional items to the underlying base content. As a simple example, a video may be streamed from a content server such as provided by one of many video streaming services. According to certain embodiments of disclosure, supplemental transactional items are added on-the-fly to such content. The below disclosure, among other things, discloses the determination of which supplemental transactional items to provide—given base content, a user profile, a device profile, other possible items.

FIGS. 2A-2E illustrate a dynamic binding of supplemental transactional items 210 to base content 200, according to an embodiment of the disclosure. As seen in FIGS. 2A-2E, the base content 200 is generally shown. The base content 200 represents literally any type of visual content—be it a picture, a recorded streaming video, a live stream from a remote location, real-time content from the current location of a device, a web page, or other types of visual content. Although the displayable area for the base content 200 is generally shown as having a rectangular boundary area, the displayable area for the base content 200 may take on other shapes. Additionally, the base content 200 may be shown in (or through) a virtual limitless number of devices from mobile phones to computers to televisions.

As examples of the above, the base content 200 may be a video streamed through a video-based provider such as Youtube, Vimeo, Netflix, Redbox Instant or others—being viewed on a computer, a mobile device, or a television screen or any of suitable device or devices. Alternatively, the base content 200 may be real-time view of content at a current location being viewed through an electronic device such a Google Glass or the real-time view in a mobile computing device such a tablet or a phone. In yet other configurations, the base content 200 may be an image. In still yet other configurations, the base content 200 may be a web page.

Also shown in FIGS. 2A-2E are non-limiting examples of the supplemental transactional items 210a, 210b, 210c, 210d, and 210e that are configured to dynamically bind to the base content 200. Although certain examples are provided, it should be understood that such examples are non-limiting and other configurations may be utilized as will become apparent to one of ordinary skill in the art having read this disclosure.

Figure 2A:
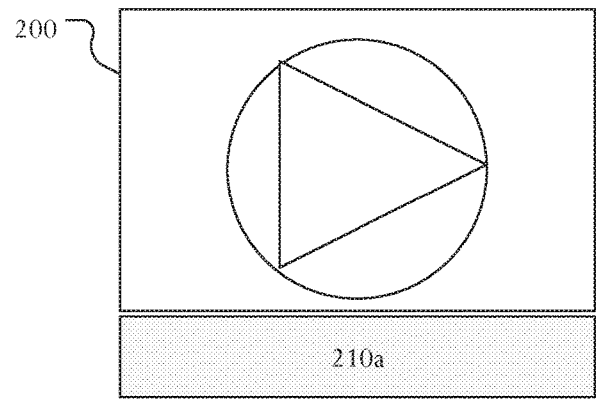
FIGS. 2A-2E illustrate a dynamic binding of supplemental transactional items to base content, according to an embodiment of the disclosure.
Figure 2B:
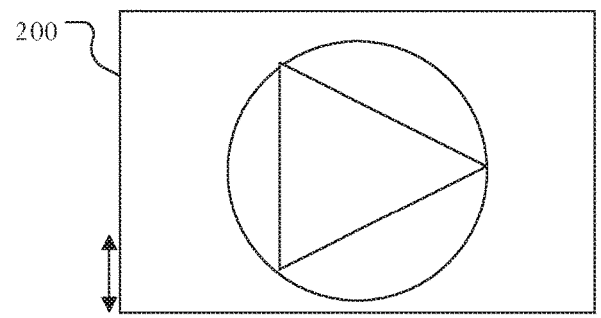

In certain configurations, the supplemental transactional items 210 may visually be depicted as overlaying the base content—partially transparent or not. An example of supplemental transactional items 210b overlaying the base content is shown in FIGS. 2B (left position) and 2E. As used herein, reference to an overlay of one piece of content over another does not necessarily mean an actual overlay must occur. Rather, such an overlay can be a visual depiction.

Figure 2C:
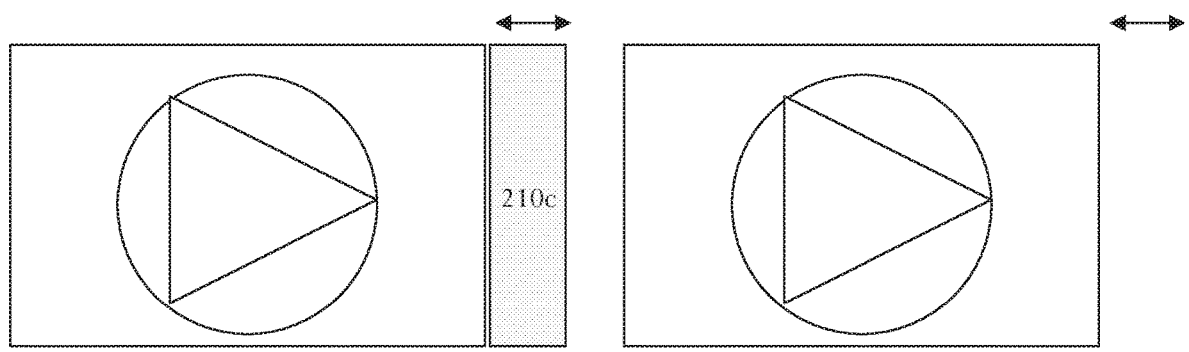

In other configurations, the supplemental transactional items 210 may be positioned outside of the base content 200, for example, to the left, right, top, bottom, or other positions. Examples of supplemental transactional items outside of a boundary area of the base content 200 are shown in FIGS. 2A and 2C (left position) and 2D.

In certain configurations, the supplemental transactional items 210 may be selectively displayable and/or selectively hideable, for example due to user action or inaction. For example, in certain configurations, a user taking an interaction with the container for the base content may cause a menu with supplemental transactional items 200 to appear. Examples of the configurations in the preceding two sentences are shown in FIGS. 2B and 2C with the double-edged arrows representing selective displayability or selective hideability.

Figure 2D:
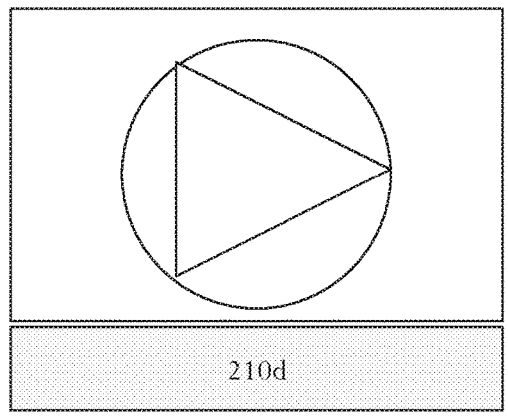
Figure 2D:
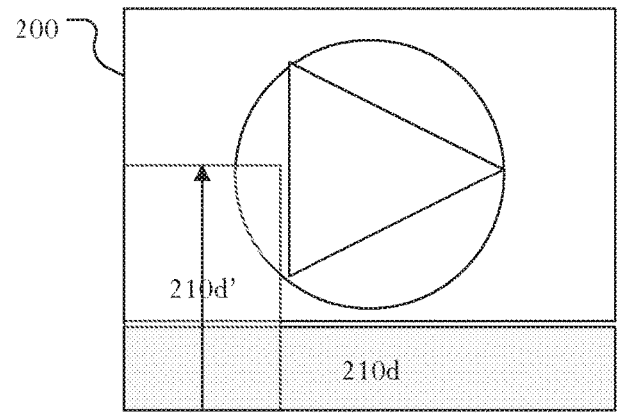
Figure 2E:
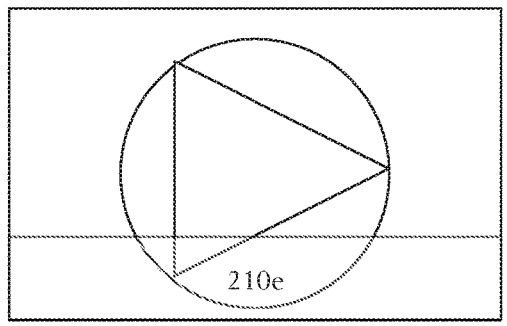
Figure 2E:
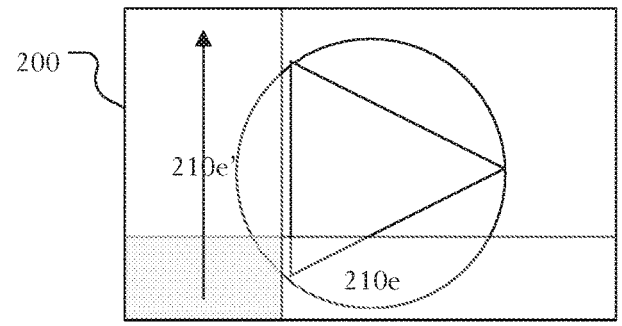

In still yet other configurations, the supplemental transactional items 200 may be begin outside an area of the base content 200 and expand to cover—partially transparent or not—the base content 200. For example, as seen in FIG. 2D, the position of the supplemental transactional items 210d on the left is just below a displayable area for the base content 200. However, in the position of the supplemental transactional items 210d on the right (which may be the result of interactivity by a user), the supplemental transactional items 210d expands (as shown by area 210d') to at least partially overlay the base content 200. A similar configuration is also shown in FIG. 2E except that the supplemental transactional items 210e began as an overlay of the screen and area 210e covers an entire edge of the displayable area for the base content 200.

In particular configurations, the supplemental transactional items 210 is independent of the base content 200 and is bound on-the-fly as the supplemental transactional items 210 is displayed. For example, in particular settings, a web page may have a container (which may be invoked by an embed code) that instantiates (1) the base content and (2) the supplemental transactional items. According to certain configurations, the call for the supplemental transactional items can be based on what is being shown in the base content with the supplemental transactional items specifically relating to the base content. The supplemental transaction items can be one or more products or services. Additionally, the supplemental transactional items may be based on other parameters such a user profile or a geolocation of the user viewing the base content. As another example, in other configurations, a page analyzer can review a web page to determine locations where base content is contained and overlay or adjust such base content. Further details of systems and configurations for selecting the particular supplemental transactional items to display for base content is described below.

According to this specification, the concept of "binding" refers to associating the supplemental transactional items 210 with the base content 200 whereas "dynamic binding" refers to associating content on the fly, for example, upon a detection of the base content. In particular configurations, the initial association may allow the subsequent sharing of both the supplemental transactional items 210 and the base content 200 together as will be described with reference to figures below. More particularly, in certain configurations, an initial dynamic binding yields a shareable container (which may be an embed code or not) that upon being shared to a new device calls the underling base content and the supplemental transactional items. In other configurations, no such container is created. Rather, a dynamic binding or dynamic association of the supplemental transactional items is done for every playing of the video. In yet other configurations, supplemental transactional items may be bound to a video; however, the particular content is dynamically determined when the video is requested for playback.

A variety of technologies may be used for the above described dynamic binding. As a non-limiting configuration, the supplemental transactional items 210 may be configured as one layer in a display where the base content 200 is another layer. In such configurations, the layer for the supplemental transactional items 210 may be forward in the layers to allow an overlay as might be appropriate. In other configurations, the supplemental transactional items 210 may simply be provided a positioning with respect to the base content 200.

In particular configurations, the supplemental transactional items 210 can be dynamically sized based on a determined size of the base content 200 and/or the spacing configurations for the device on which the base content 200 and supplemental transactional items 210 will be displayed. In other configurations, given a particular size for the base content, the supplemental transactional items 210 may use the same size for a container that requests a slightly reduced size base content 200 with extra room for the supplemental transactional items 210. In implementing such a configuration, the technology can intercept a request for the base content 200 and redirect such a request for to request a container that, in turn, requests the base content 200 and then the supplemental transactional items 210. This latter configuration may be beneficial for scenarios where the supplemental transactional items 210 does not overlay the supplemental transactional items.

As alluded to above, in particular configurations, the supplemental transactional items 210 can be based on what is being shown in the base content 200. A variety of technologies may be utilized to recognize the base content 200. Additionally, in particular configurations, a combination of technologies may be utilized. Further, as discussed in more details below, the supplemental transactional items 210 can be customized depending on a user and/or device.

Various embodiments described herein may avail benefits from and/or utilize one or more technologies and embodiments described in U.S. application Ser. No. 14/512,204 filed Oct. 10, 2014, U.S. application Ser. No. 14/484,065, filed Sep. 11, 2014, U.S. application Ser. No. 14/484,225, filed Sep. 11, 2014, U.S. application Ser. No. 14/498,800, filed Sep. 26, 2014, U.S. application Ser. No. 14/497,686, filed Sep. 26, 2014, U.S. application Ser. No. 14/633,986, filed Feb. 27, 2015, U.S. application Ser. No. 14/644,603, filed Mar. 11, 2015, in combination with the embodiments disclosed herein; the entirety of each of the aforementioned applications is hereby expressly incorporated by reference herein for all purposes. Various embodiments described herein may avail benefits from and/or utilize one or more technologies and embodiments as detailed and described in U.S. Pat. App. Pub. No. 2014/0089966, U.S. Pat. App. Pub. No. 2014/0095330, U.S. Pat. App. Pub. No. 2015/0319501, U.S. Pat. App. Pub. No. 2016/0029090, U.S. Pat. App. Pub. No. 2015/0039468, U.S. Pat. App. Pub. No. 2014/0032366, U.S. Pat. App. Pub. No. 2014/0250211, U.S. Pat. App. Pub. No. U.S. Pat. App. Pub. No. 2015/0073919, U.S. Pat. App. Pub. No. 2015/0074710, U.S. Pat. App. Pub. No. 2015/0074711, U.S. Pat. App. Pub. No. 2015/0095455, U.S. Pat. App. Pub. No. 2015/0092111, U.S. Pat. App. Pub. No. 2015/0245084, and U.S. Pat. App. Pub. No. 2015/0264417; the entirety of each of the aforementioned publications is hereby expressly incorporated by reference herein for all purposes One or more embodiments of this disclosure recognize and take into account that there is a significant shift from television networks and video content providers moving towards providing online access to their video content via streaming internet connections. This trend began with Netflix shifting its focus to online video streaming. In the past few years many others have joined. COMCAST/XFINITY now provides online video streaming to its cable customers for major shows. This allows customers to access video content from anywhere via web, tablet, and mobile devices. HBO now offers it video content via HBO GO. HULU provides a subscription services for both TV and Movie video streaming content. ABC and CBS (CBS All Access) television networks now offer similar capabilities with their content. APPLE TV, ROKU, GOOGLE CHROMECAST, AMAZON FIRE TV offer video player platforms focused on Internet base streaming video content.

The primary current economic model for online video is pure subscription services, traditional video advertisements embedded into the video stream, or a combination of both. The problem with embedded advertising is that it both disrupts the viewer's attention and also requires that transition away from viewing the video content to investigate more, or to purchase the advertised product or service. The business models rely on legacy video advertising models inherited from one way broadcast technology. With the advent of online internet video and video players on computers, tablets, smart phones, and smart streaming players and televisions, there exists opportunities to revolutionize video advertising and to bring a new concept called "video commerce" into the mainstream.

Figure 3:
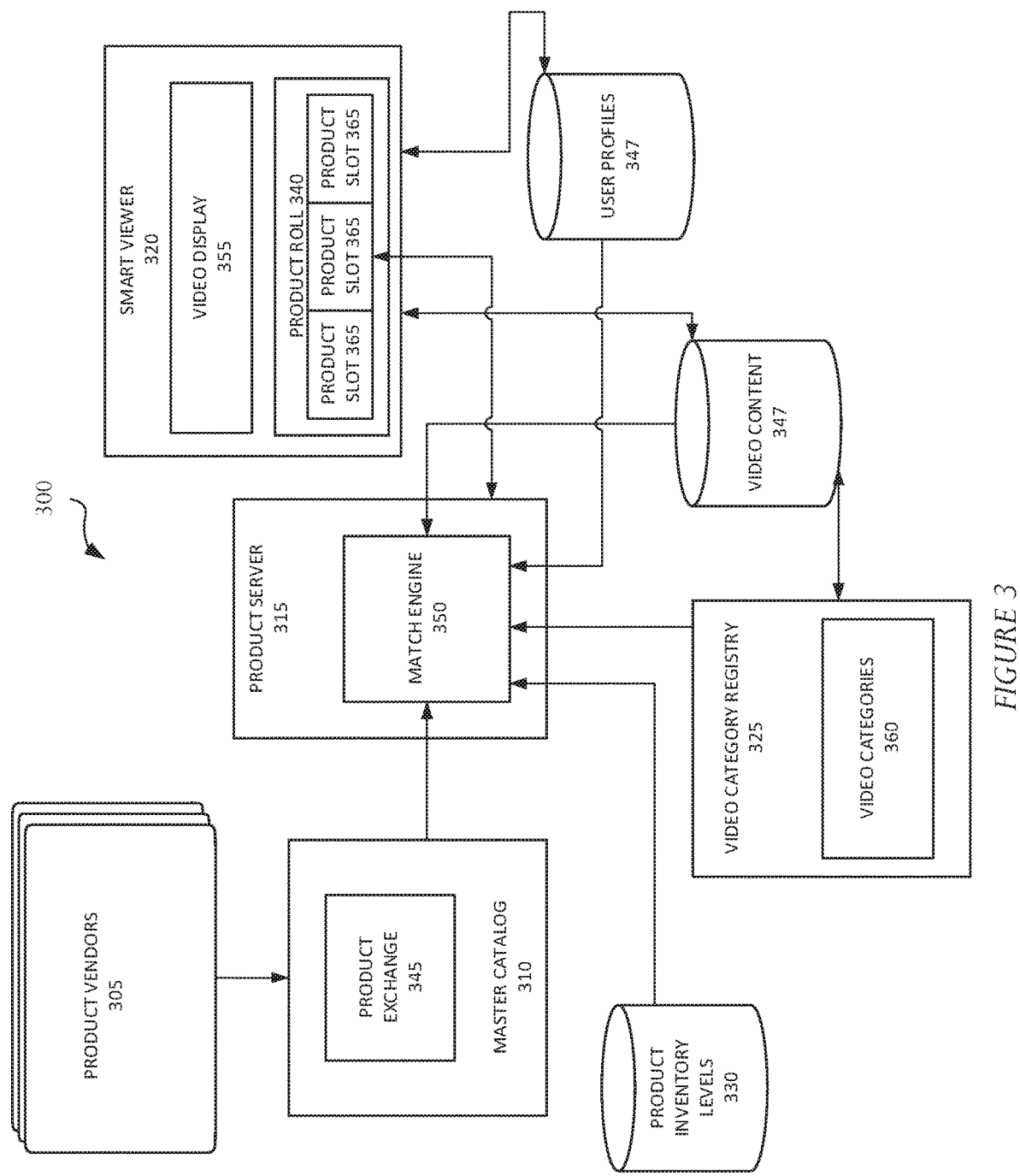
FIG. 3 illustrates a platform for a master catalog in a product exchange according to an embodiment of the disclosure.

FIG. 3 illustrates a platform 300 for a master catalog in a product exchange according to an embodiment of the disclosure. The platform 300 of FIG. 3 may be particularly well suited for managing data associated with the base content 200 and the supplemental transactional items 210 discussed with reference to FIGS. 2A-2E as well as the SMART CONTAINER objects or code referenced above. As described herein, the supplemental transactional items 210 may contain interactive items that allow users to purchase goods or services.

The platform 300, according to certain configurations, can have product vendors 305, master catalog 310, product server 315, smart viewer 320, video category registry 325, and product inventory levels 330. Product server 315 can be configured to monitor products to put into a product roll 340. The determination of which products to put into the product roll 340 is related to a product exchange 345 and product inventory levels 330.

In an embodiment, product vendors 305 may include, but are not limited to, the different product vendors that are registered with the master catalog, including what products the vendor currently sells, what logos are associated with the vendor, the market of the vendor, and the like.

In an embodiment, a match engine 350 of product server 315 can be configured to retrieve information from smart viewer 320. Smart viewer 320 can be an example of a SMART CONTAINER. The information can be keywords, hashtags, categories, and the like. In an example, match engine 350 can match keywords and hashtags to products in product exchange 345.

The smart viewer 320 provides a user interface model for offering non-intrusive products and services integrated with a video viewing experience. The smart viewer 320 allows the viewer to browse and transacts within the video viewing experience through the product roll 340 and includes the ability to offer products and services related to the video content 343 to the viewer. The video content 343 can be an example of base content 200 as shown in FIGS. 2A-2E.

The smart viewer 320 is designed to dynamically configure for optimal viewing and operation on a full range of connected devices including smart phones, tables, set top boxes, smart TVs and traditional personal computers. The smart viewer 320 can be virally shared on the Internet via social networks, email, blogs, and related Internet distribution methods. It also provides security controls to choose where to display or block shows and movies worldwide via geo-blocking capabilities that enforce distribution rights. The smart viewer 320 can be used to offer TV show and movie subscription content hosted either on specific Internet destinations, or accessed via viral sharing via shared online user communities.

In addition to offering video entertainment content, the smart viewer 320 provides an enhanced user interface, which supports interactive e-commerce. The e-commerce interface allows users viewing entertainment content to receive, browse, and transact product and service advertisements and offerings from within the smart viewer 320 in the product roll 340, without interrupting the entertainment content shown in video display 355.

The match engine 350 of product server 315 can configure the e-commerce advertisement and product offerings to relate to the content of the show or movie being watched. The offered products can dynamically change based on the current show or movie. When the video is shared on social media and through email, the product offerings are also shared.

Currently the online advertising industry uses an exchange model for "display/image" advertising on web properties. Advertising customers may purchase a quantity of display ad impressions to be shown over a certain period of time. Billing modes may consist of the number of display impressions delivered and/or the number of displayed ads which was actually acted on by end users. These ad exchanges maintain a large collection of affiliate target web properties that they serve display ads on. These target website properties receive financial compensation for showing ads on their web site(s). The target web sites are typically categorized into market types. Various target websites may have an orientation towards sports, technology, home improvement, travel, automotive, hobbies, etc. Different areas of particular target website properties may be in different categories. For example news websites may have different sections of their site devoted to sports, entertainment, technology, etc. When advertisers purchase display ad impressions, the advertisers also will specify which market categories of websites that the advertisers desire ads to be displayed. Target website properties in the affiliate network provision empty "ad slots" on their website. Each time a particular webpage is displayed fore that website, that page will dynamically call the ad exchange to fill the ad slot and the ad exchange will be determined based the current pool of ads needing display, the market category of the page being displayed, and other criteria such as end user attributes.

There exists no such model for the direct sale of online goods and services. Various embodiments of this disclosure provide an online product exchange for the sales of video e-commerce goods and services sold within the smart viewer 320. Product vendors 305, such as online ecommerce vendors who wish to sell their goods online, can enter their various product offerings into the product exchange 345.

The video category registry 325 maintains an inventory of video and movie content being displayed in the universe of currently active smart viewer properties and video categories 360. The video categories 360 can contain information about brands, products, services, people, and the like. In one example embodiment, the video category registry 325 can also be referred to as video content information. The video category registry 325 could also include other types of information about the video, such as length of time, audience rating, critic rating, Motion Picture Association of America rating, popularity, rate at which users buy products sold with the video, etc.

The smart viewer 320 provides an option for products and services being shown in the active product roll 340 to dynamically fetch from the current inventory, based on product inventory levels 330, of available products and services in the online product exchange 345. Items fetched will be matched by match engine 350 on criteria related to the video(s) being shown as well as other end user attributes. The user attributes can be stored in a database for user profiles 347. Each profile in the user profiles 347 can include a number of user attributes. User attributes may include geography, time of day, and user demographic information. Other criteria which may influence which items from the product exchange 345 are show may include inventory levels, price tier, etc. The items may be shown in a product slot 365 of the product roll 340.

The owner of a particular smart viewer may configure online product rolls to offer only their own products or a blend including relevant items from the online product exchange 345. End users viewing the video in the smart viewer 320 may directly purchase items in the product roll 340, including those coming from the exchange 345, without a need to disrupt watching the video or traveling to other web destinations to complete their purchase.

Figure 4:
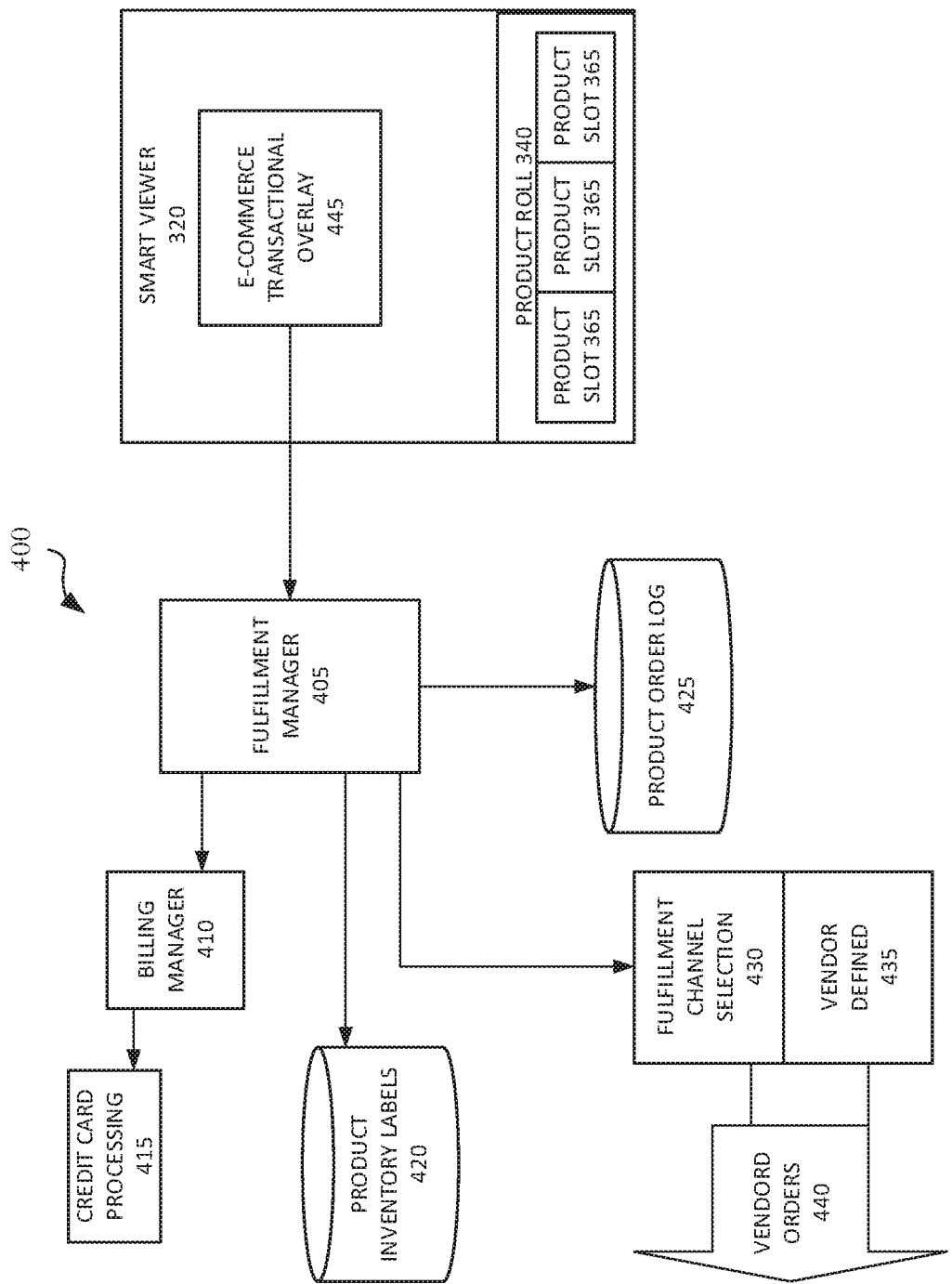
FIG. 4 illustrates a platform for ordering in a product exchange according to an embodiment of the disclosure.

FIG. 4 illustrates a platform 400 for ordering in a product exchange according to an embodiment of the disclosure. The platform 400 of FIG. 4 may be particularly well suited for managing data associated with the base content 200 and the supplemental transactional items 210 discussed with reference to FIGS. 2A-2E as well as the SMART CONTAINER objects or code referenced above. As described herein, the supplemental transactional items 210 may contain interactive items that allow users to purchase goods or services.

The platform 400, according to certain configurations, can have a fulfillment manager 405, billing manager 410, credit card processing 415, product inventory levels 420, product order log 425, fulfillment channel selection 430, vendor defined 435, vendors orders 440, smart viewer 320, and product roll 340. The smart viewer can include an e-commerce transaction overlay 445 and product roll 340 can include product slots 365. The product inventory levels 420 can be one example of product inventory levels 330 of FIG. 3.

The owner of a particular smart viewer 320 can receive a commission for products sold in the product roll 340 in their smart viewer 320, which comes from the product exchange. Commission rates may vary based on business agreements related to volume, geography served, product category, and the like. In other embodiments, the owner of the smart viewer 320, product vendors 305, owner of the product exchange 345, or a combination thereof can collect commission and/or fees from the sale of products or services sold in the smart viewer 320. The smart viewer 320 can by implemented anywhere in the world and each instance of the smart viewer 320 can be different or the same from another instance of the smart viewer 320 allowing for vendors 305 to sell products globally.

Since the product roll 340 within the smart viewer 320 may contain product offerings from multiple sources, the fulfillment of orders may need to be subdivided by the fulfillment manager 405. The online product exchange 345 maintains a fulfillment channel attribute, which controls how various products are paid for and shipped. The e-commerce transaction overlay 445 allows end users to use a single unified payment method for their order, and product exchange backend services through the billing manager 410 allocate payments to the various product suppliers involved in the order for a given customer.

The smart viewer 320 provides the infrastructure for this multi-dimensional multi-vendor master product catalog along with fulfillment channels with fulfillment channel selection 430 where with a vendor defined 435 to complete vendor orders 440. Fulfillment channel selection 430 identifies what entity will ship or fulfil the product. Vendor defined 435 identifies vendor associated with each fulfillment.

This allows a wide range of matching appropriate and optimal product content between show and movie content and product offerings. Product matching rules for the master product and advertising catalog can be configured based on licensing and business agreements such that only certain business affiliates or fulfillment channels are utilized for particular product or advertising content. The matching engine uses a variety of analytical modes is used to determine optimal matches. Matching criteria may include user attributes in a user profile, such as user profiles 357 of FIG. 3, for example, user demographics, viewing preferences, geographic location, age, postal code, gender, likes/dislikes, a time of day of video content access, local neighborhood, shopping behavior, and purchase history. The product matching rules can be configured by the owner of the smart viewer 320, product vendors 305, owner of the product exchange 345, or a combination thereof.

In addition to core product offerings, the e-commerce transaction overlay 445 can be configured to display additional recommended, trending or the most popular products within or external to the viewing window. Such recommendations are customized to what's new and what the user has been watching.

The smart viewer 320 infrastructure also offers entertainment content review and recommendation services. Based on viewer history, the engine will recommend appropriate shows and movies to watch. It can be configured to display related reviews using both internal content as well as imported review content from external services such as "Rotten Tomatoes". A consolidated advanced ratings system can calculate all user opinions for given shows and display multi-dimensional user feedback for any given show or movie.

It also supports a coupon and discounting system to incentivize users to try out or purchase specific content. These incentives can be configured based on product inventory levels as well as user purchase and viewing behavior. In addition to coupons, a rewards mechanism is available to provide discounts and promotional "bucks" to allow users to earn points for watching various shows and movies, and redeemed when shopping within the e-commerce environment. The more a user watches, the more reward bucks they earn. These "bucks" are redeemable in any video smart store for any product and applied towards discounts and sales.

Credit card processing 415 can process a credit card or other method of payment for each vendor that is part of the transaction. In another embodiment, a single processing is performed and then each vendor is paid separately by the entity receiving the funds from single processing.

Product order log 425 can keep a record of all orders and product inventory labels can print labels for shipping from a fulfillment center.

Figure 5:
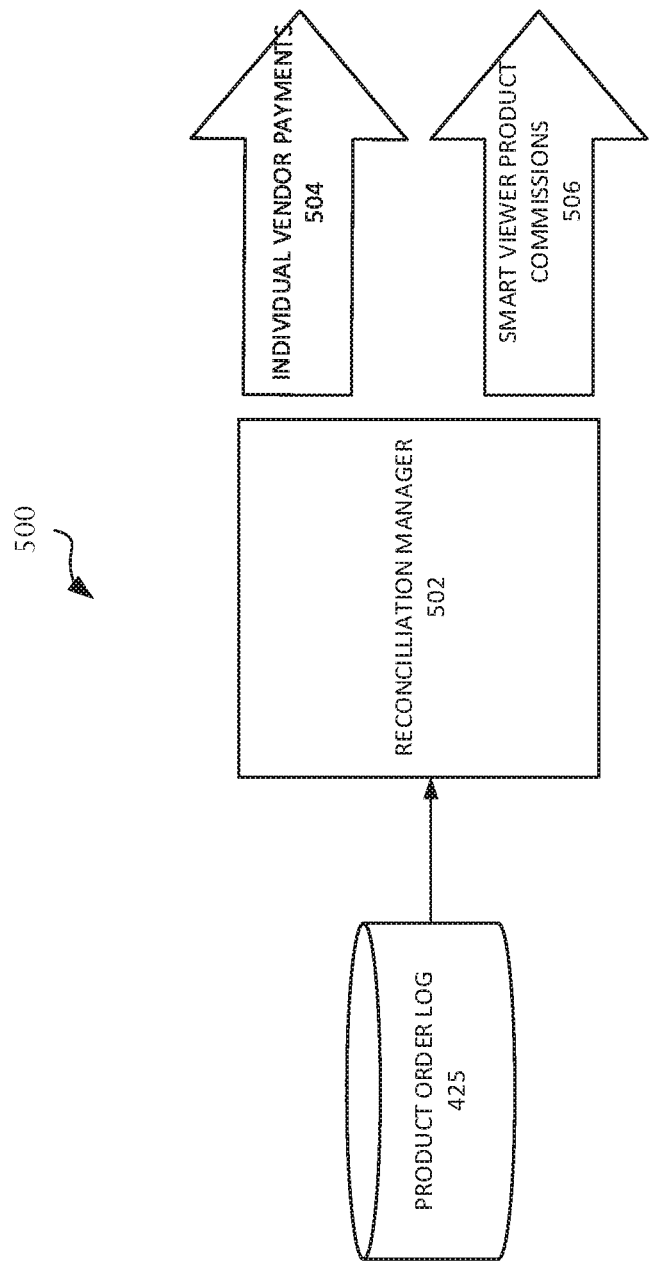
FIG. 5 illustrates a platform for ordering in a product exchange according to an embodiment of the disclosure.

FIG. 5 illustrates a platform 500 for ordering in a product exchange according to an embodiment of the disclosure. The platform 500 of FIG. 5 may be particularly well suited for managing data associated with the base content 200 and the supplemental transactional items 210 discussed with reference to FIGS. 2A-2E as well as the Smart Container™ objects or code referenced above. As described herein, the supplemental transactional items 210 may contain interactive items that allow users to purchase goods or services.

The platform 500, according to certain configurations, can have product order log 425 and reconciliation manager 502. The reconciliation manager 502 can receive information from the product order log 425 regarding different orders and reconcile the collected funds to send out individual vendor payments 504 and smart viewer product commission 506.

Figure 6:
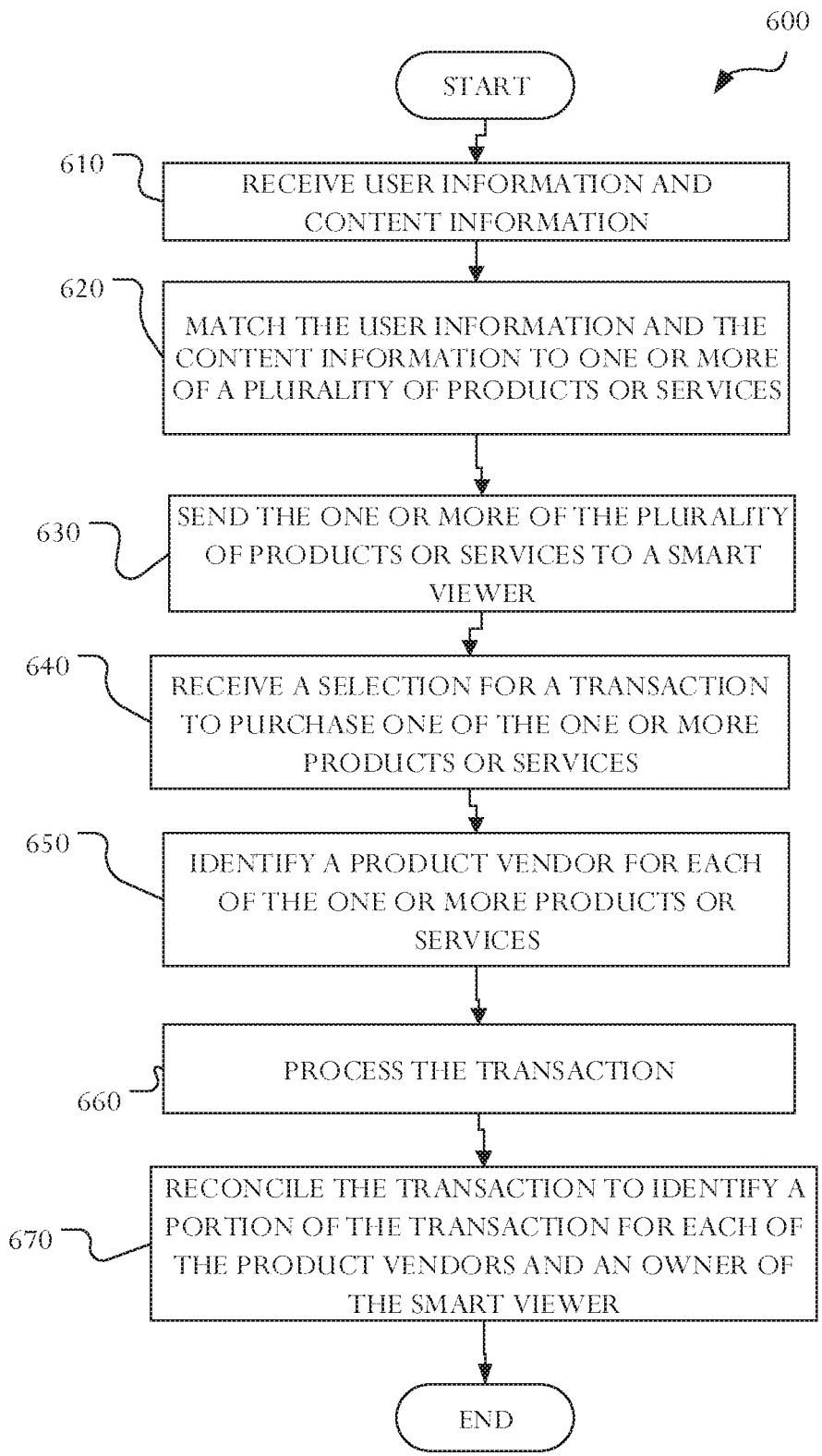
FIG. 6 illustrates a process for managing a product exchange according to an embodiment of the disclosure.

FIG. 6 illustrates a process 600 for managing a product exchange according to an embodiment of the disclosure. The process 600 described with reference to FIG. 6 generally corresponds to the platform 300 of FIG. 3, platform 400 of FIG. 4, and platform 500 of FIG. 5. The various operations below may be performed by a decision engine, controller, or a combination of the two while in connection with a memory element.

At operation 610, a controller is configured to receive user information and content information. At operation 620, the controller is configured to match the user information and the content information to one or more of a plurality of products or services. At operation 630, the controller is configured to send the one or more products or services to a smart viewer. At operation 640, the controller is configured to receive a selection for a transaction to purchase one of the one or more products or services. At operation 650, the controller is configured to identify a product vendor for each of the one or more products or services. At operation 660, the controller is configured to process the transaction. At operation 670, the controller is configured to reconcile the transaction to identify a portion of the transaction for each of the product vendors and an owner of the smart viewer.

FIG. 7 is an embodiment of a general purpose computer 710—components of which that may be used in connection with other embodiments of the disclosure to carry out any of the above-referenced functions and/or serve as components for a computing device for endpoint(s) 110 and endpoint(s) 120 of FIG. 1. General purpose computer 710 may generally be adapted to execute any of the known OS2, UNIX, Mac-OS, Linux, Android and/or Windows Operating Systems or other operating systems. The general purpose computer 610 in this embodiment includes a processor 712, a random access memory (RAM) 714, a read only memory (ROM) 716, a mouse 718, a keyboard and input/output devices such as a printer 624, disk drives 722, a display 726 and a communications link 728. In other embodiments, the general purpose computer 710 may include more, less, or other component parts. Embodiments of the present disclosure may include programs that may be stored in the RAM 714, the ROM 716 or the disk drives 722 and may be executed by the processor 712 in order to carry out functions described herein. The communications link 728 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 722 may include a variety of types of storage media such as, for example, floppy disk drives, hard disk drives, CD ROM drives, DVD ROM drives, magnetic tape drives or other suitable storage media. Although this embodiment employs a plurality of disk drives 722, a single disk drive 722 may be used without departing from the scope of the disclosure.

Although FIG. 7 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general purpose computers 710 or other computers networked together in a computer network. Most commonly, multiple general purpose computers 710 or other computers may be networked through the Internet and/or in a client server network. Embodiments of the disclosure may also be used with a combination of separate computer networks each linked together by a private or a public network.

Additionally, in particular embodiments, the general purpose computers 710 computers may be mobile devices that include features such as cameras, camcorders, GPS features, and antennas for wireless communications. Mobile devices such as these include those marketed as iPhone and Android phones.

Several embodiments of the disclosure may include logic contained within a medium. In the embodiment of FIG. 7, the logic includes computer software executable on the general purpose computer 710. The medium may include the RAM 714, the ROM 716, the disk drives 722, or other mediums. In other embodiments, the logic may be contained within hardware configuration or a combination of software and hardware configurations.

The logic may also be embedded within any other suitable medium without departing from the scope of the disclosure.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a memory element configured to store a plurality of products and services associated with a plurality of vendors; and
a processor configured to:
receive profile information for a user accessing video content in a smart viewer;
receive content information, the content information identifying a category the of the video content accessed by the user;
identify a supplemental transactional item, the supplemental transactional item being related to two or more products or services from the plurality of products and services based on the profile information and the category of the video content;
in response to the identifying the supplemental transactional item, dynamically bind the supplemental transactional item with the video content to generate a shareable media container, the shareable media container configured to:
display the supplemental transactional item and the video content via the smart viewer, and
mediate, upon selection of the supplemental transactional item, an e-commerce transaction associated with the two or more products or services via the smart viewer, without re-directing or disrupting the display of the video content; and
send the shareable media container to the smart viewer.

2. The apparatus of claim 1, the shareable media container being further configured to:
receive a selection indicating a desire for an e-commerce transaction to purchase the two or more products or services;
identify a product vendor for each of the two or more products or services; and
process the e-commerce transaction.

3. The apparatus of claim 1, wherein each product or service from the two or more products or services is associated with a vendor of at least two vendors, the shareable media container being further configured to:
receive a selection indicating a desire for an e-commerce transaction to purchase the two or more products or services;
process the e-commerce transaction;
receive information associated with a set of collected funds associated with the e-commerce transaction; and
reconcile the set of collected funds associated with the e-commerce transaction to identify a portion of the set of collected funds to be allocated to each vendor from the at least two vendors and an owner of the smart viewer.

4. The apparatus of claim 3, wherein processing the e-commerce transaction includes receiving a single payment from the user.

5. The apparatus of claim 1, wherein each product or service from the two or more products or services is associated with a vendor of at least two vendors, the processor further configured to:
identify an inventory levels associated with each product or service from the plurality of products and services; and
select the two or more products or services from the plurality of products and services based on the inventory level associated with the plurality of products and services.

6. The apparatus of claim 1, wherein the profile information includes one or more of a geographic location of the user, a time of day of the user access to the video content, or user demographic information.

7. The apparatus of claim 1, wherein the processor is further configured to:
send a recommendation of one or more trending products or services to the smart viewer.

8. The apparatus of claim 1, wherein the shareable media container is configured to mediate the e-commerce transaction using the shareable media container.

9. A processor-implemented method for product matching, the method comprising:
receiving profile information for a user accessing a video content;
receiving content information for the video content accessed by the user in a smart viewer, the content information identifying a category of the video content;
identifying a supplemental transactional item, the supplemental transactional item being related to two or more products or services, based on the profile information and the category of the video content, the two or more products and services being associated with a plurality of vendors;
in response to the identifying the supplemental transactional item, dynamically binding the supplemental transactional item with the video content to generate a shareable media container, the shareable media container configured to
display the supplemental transactional item and the video content via the smart viewer, and
mediate, upon selection of the supplemental transactional item, a transaction associated with the two or more products or services via the smart viewer and without re-directing or disrupting the display of the video content; and
sending the shareable media container to the smart viewer.

10. The processor-implemented method of claim 9, further comprising:
receiving a selection of the supplemental transactional item indicating a desire for a transaction to purchase at least one product or service from the two or more products or services;
identifying a product vendor for each of the two or more products or services; and
processing the transaction.

11. The processor-implemented method of claim 9, wherein each of the two or more products or services is associated with a vendor from two or more vendors, the method further comprising:
- receiving a selection of the supplemental transactional item indicating a desire for a transaction to purchase the two or more products or services;
- processing the transaction;
- receiving information associated with a set of collected funds associated with the transaction; and
- reconciling the set of collected funds associated with the transaction to identify a portion of the set of collected funds to be allocated to each vendor from the two or more vendors and an owner of the smart viewer.

12. The processor-implemented method of claim 9, wherein the-two or more products or services are selected from a plurality of products and services, the method further comprising:
- identifying inventory levels associated with each product or service from the plurality of products and services; and
- selecting the two or more products or services from the plurality of products and services based on the inventory levels.

13. The processor-implemented method of claim 9, wherein the profile information includes one or more of a geographic location of the user, a time of day of the user access to the video content, or user demographic information.

14. The processor-implemented method of claim 9, wherein the shareable media container is further configured to process the transaction associated with the two or more products or services with a single payment from the user.

15. The processor-implemented method of claim 9, further comprising:
- sending a recommendation of one or more trending products or services to the smart viewer.

16. The processor-implemented method of claim 9, further comprising:
- mediating the transaction using the shareable media container, without re-directing or disrupting the display of the video content.

17. A non-transitory computer readable medium embodying a computer program, the computer program comprising computer readable program code that when executed causes at least one processing device to:
- receive profile information for a user accessing a video content;
- receive content information for the video content accessed by the user in a smart viewer, the content information identifying a category the of the video content;
- identify a supplemental transactional item, the supplemental transactional item being related to two or more products or services, based on the profile information and the category of the video content, the two or more products or services being associated with a plurality of vendors;
- in response to the identifying the supplemental transactional item, dynamically bind the supplemental transactional item with the video content to generate a shareable media container, the shareable media container configured to:
  - display the supplemental transactional item and the video content via the smart viewer, and
  - mediate, upon selection of the supplemental transactional item, a transaction associated with the two or more products or services via the smart viewer and via the shareable media container without re-directing or disrupting the display of the video content; and
- send the shareable media container to the smart viewer.

18. The non-transitory computer readable medium of claim 17, wherein the computer readable program code, when executed, further causes the at least one processing device to:
- receive a selection of the supplemental transactional item indicating a desire for a transaction to purchase at least one product or service of the two or more products or services;
- identify a product vendor for each product or service of the two or more products or services; and
- process the transaction.

19. The non-transitory computer readable medium of claim 18, wherein the computer readable program code, when executed, causing the at least one processing device to process the transaction comprises computer readable program code that, when executed, causes the at least one processing device to process the transaction associated with each product or service of the two or more products or services with a single payment from the user.

20. The non-transitory computer readable medium of claim 17, wherein each product or service from the two or more products or services is associated with a vendor from at least two vendors, and the computer readable program code, when executed, further causes the at least one processing device to:
- receive a selection indicating a desire for a transaction to purchase the two or more products or services;
- process the transaction;
- receive information related to a set of collected funds associated with the transaction; and
- fulfill a set of payments associated the transaction, the set of payments being directed to each vendor of the at least two vendors.

21. The non-transitory computer readable medium of claim 17, wherein the two or more products or services are selected from a plurality of products and services, and the computer readable program code computer readable program code that, when executed, causes the at least one processing device to:
- identify inventory levels associated with each product or service from the plurality of products and services; and
- select the two or more products or services from the plurality of products and services based on the inventory levels.

22. The non-transitory computer readable medium of claim 17, wherein the profile information includes one or more of a geographic location of the user, a time of day of the user access to the video content, or user demographic information.

23. The non-transitory computer readable medium of claim 17, wherein the shareable media container is configured to mediate the transaction using the shareable media container.

* * * * *